United States Patent [19]

Horváth et al.

[11] 4,170,850
[45] Oct. 16, 1979

[54] APPARATUS FOR COPY MACHINING HAVING A MANUAL CONTROL

[75] Inventors: Kálmán Horváth; Bruno Erényi, both of Budapest, Hungary

[73] Assignee: Szerszámgépipari Művek, Budapest, Hungary

[21] Appl. No.: 913,050

[22] Filed: Jun. 6, 1978

Related U.S. Application Data

[63] Continuation-in-part of Ser. No. 834,823, Sep. 6, 1977, abandoned, which is a continuation of Ser. No. 653,151, Jan. 28, 1976, abandoned.

[30] Foreign Application Priority Data

May 7, 1975 [HU] Hungary .............................. SE 1781

[51] Int. Cl.² ........................................... B24B 49/12
[52] U.S. Cl. ................................ 51/165 R; 51/165.72; 318/578; 318/628
[58] Field of Search ........................ 51/165 R, 165.72; 318/628, 666, 625, 578

[56] References Cited

U.S. PATENT DOCUMENTS

| | | | |
|---|---|---|---|
| 2,509,617 | 5/1950 | Skillam | 318/628 |
| 3,650,075 | 3/1972 | Mason | 51/165.72 |
| 3,670,460 | 6/1972 | Oldfield | 51/165.72 |

FOREIGN PATENT DOCUMENTS 228737  7/1969  U.S.S.R. ................. 51/165.72

Primary Examiner—Harold D. Whitehead

[57] ABSTRACT

Apparatus for copy machining provided with two motor driven carriage saddles, and with a steering disc, the latter being connected to sliding contacts of two potentiometers having several tappings through a control disc and a transmission mechanism. The potentiometers are divided in four equal parts by five tappings. In each potentiometer the first, middle and the last tapping are connected to each other, and the remaining two are also connected.

The potentiometers occupy a phase position complying with the angular displacement of the steering disc, whereas the terminals are connected to the motors. The potentiometers determine the ratio of the revolution numbers of the motors to each other, i.e. the direction of tool movement. A third potentiometer controls the speed of the tool movement.

3 Claims, 2 Drawing Figures

APPARATUS FOR COPY MACHINING HAVING A MANUAL CONTROL

This application is a continuation-in-part of application Ser. No. 834,823, filed Sept. 6, 1977, and now abandoned, which is a continuation of application Ser. No. 653,151 filed Jan. 28, 1976 and now abandoned.

The invention relates to equipment for copy machining with a manual control, preferably to profile grinding machines with an optical system.

For machining plane surfaces along curved lines several solutions have been known, for example, use of templates, direct or indirect copying from copier-profiles, numerical machining with trace control, profile grinding using optical system etc.

When using optical profile grinding machines operating with a projecting system, the environment of machining is projected in magnification onto a picture screen by means of an optical system, where the silhouette of the work piece and the machining tool can be compared to the drawing of the work piece put onto the picture screen on transparent paper.

Machining takes place in such a manner that the device is moved by means of two carriage saddles and two operating elements actuating the carriage saddles, respectively, when the profile corresponding to drawing is machined on the workpiece.

In advanced machines, saddle motors have been mounted on the actuating carriage, by the aid of which straight lines in the direction of the carriage saddles can be machined by automatic feed also. In this case the carriage saddles can be swung, thus machining of oblique lines by an automatic feed becomes also possible. Taking into consideration that the control of the two motors are not connected to each other, curved lines can only be machined by manual actuation of the two carriage saddles.

The disadvantage of the known solution lies in that when performing copy machining by means of two carriage saddles and two actuating elements, respectively, concentrated attendance and practice is imperative. At the same time, copying becomes discontinuous.

The invention aims to eliminate the disadvantages mentioned above, while producing a solution, where, to achieve copying of profiles, the simultaneous displacement of the two carriage saddles does not necessarily require the simultaneous operation of several actuating elements, but selection and alteration of direction may take place with one single actuating element.

By means of said solution work can be performed more conveniently and copying becomes more accurate. Consequently, a smoother surface can be achieved.

The problem is solved in a manner such that the optical profile grinding machine operating with a projection system and provided with two carriage saddles to be displaced by respective motors is equipped with a steering disc. The steering disc is connected through a control disc and transmission mechanism to sliding contacts of potentiometers with several tappings. The potentiometers are divided into four equal parts by five tappings. The first, middle and the last one of the tappings are connected to each other. Similarly, the remaining other two tappings are also connected. The potentiometers occupy a phase-position corresponding to the angular displacement by 90° of the steering disc. The terminals of the potentiometers are connected to the motors, and a speed controlling potentiometer to be actuated by means of a pedal is also connected to the motors. The equipment is, preferably, provided with a device reproducing the signalling direction of the steering disc on the picture screen.

The invention is described by the way of a preferable embodiment, with reference to the accompanying drawings, in which.

Figure 1:
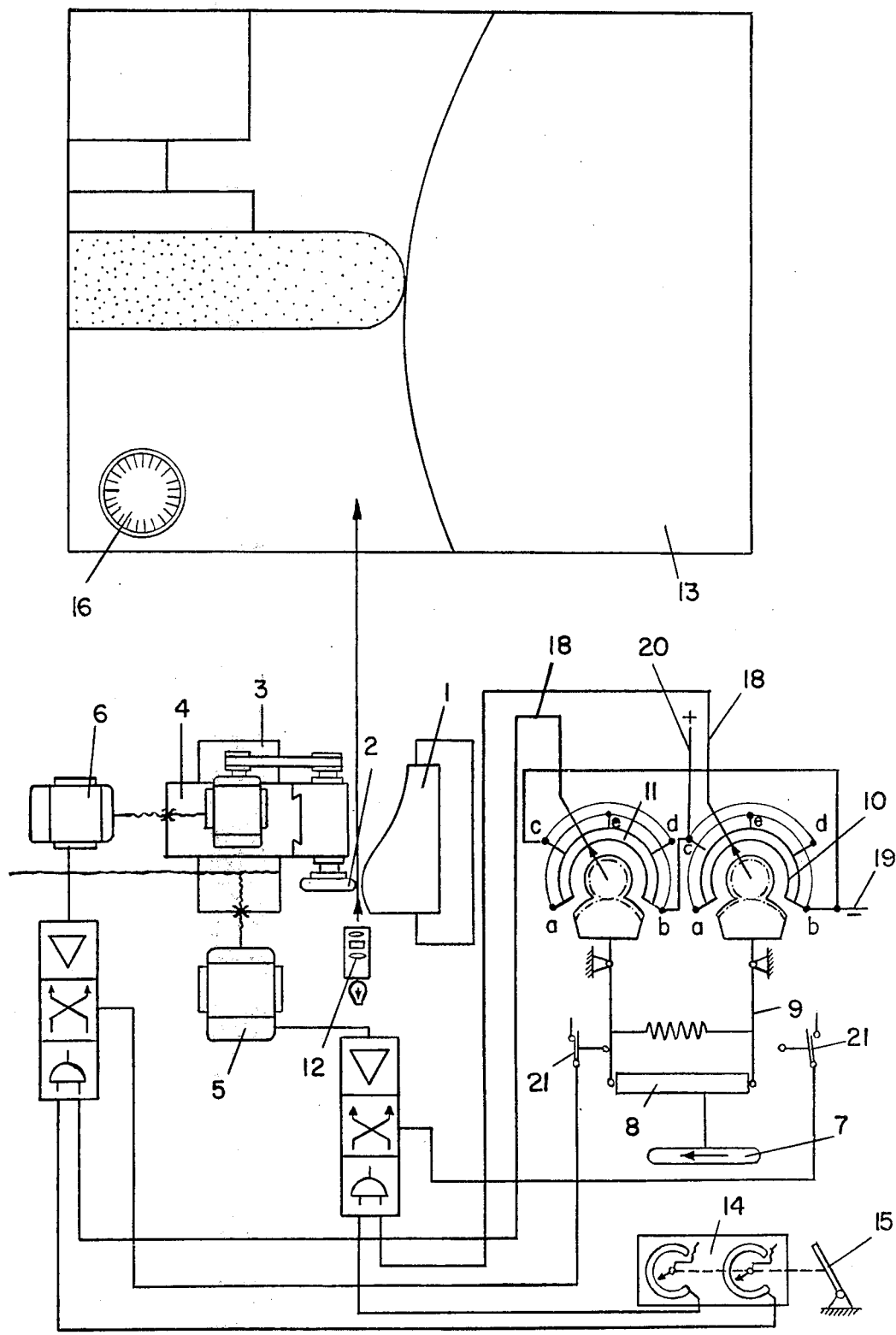
FIG. 1 illustrates the outlines of the equipment according to the invention.

As it may be seen from FIG. 1, machining of the work piece 1 of optional profile by the machining tool 2 is performed in such a way that carriage saddles 3, 4 are simultaneously displaced by means of the motors 5, 6 having a variable speed. By turning the steering disc 7 in the sense shown by the indication thereon, the drives of motors 5, 6 receive from the potentiometers 10, 11, provided with several tappings, a proportional voltage through the control disc 8 fixed onto the common axle with the steering disc and through the transmission mechanism 9. As a consequence, the direction of the resultant velocity vector resulting from the ratios of the revolution numbers of the motors agrees with the direction of the steering disc.

The optical projecting system 12 projects the silhouette of the work piece 1 and the machining tool 2 onto the picture screen 13, which can be compared to the drawing of the work piece reproduced in an adequate magnification. The position of the machining tool 2 in relation to the work piece 1 and the profile to be shaped, respectively, can be followed on the picture screen 13. Simultaneously, every displacement of the machining tool 2 can be observed also. When performing machining, by the proper turning of the steering disc 7 the machining tool 2 can be easily caused to move along a path corresponding to the profile shown on the drawing.

Potentiometers 10, 11 determine the direction of the resultant velocity only. The magnitude is controlled by the potentiometer 14 being in a logical AND-correction with the aforesaid elements. As a consequence, the value of the velocity can be optionally adjusted without changing the ratio and direction of velocity, which is especially advantageous when copying more complicated profiles. The potentiometer 14 can be easily controlled by means of the pedal 15.

In case it is indicated on the control picture screen or in the environment of the same on the direction controller 16, the direction of the arrow on the steering disc 7 by means of an illuminated plane, machining, especially matching to the surface of the work piece can be further facilitated.

Considering that between the executing and the controlling means, respectively, and the checking means there is an electrical and optical connection only, these can be located at a greater distance from each other within the machine, thus promoting convenient manipulation.

Figure 2:
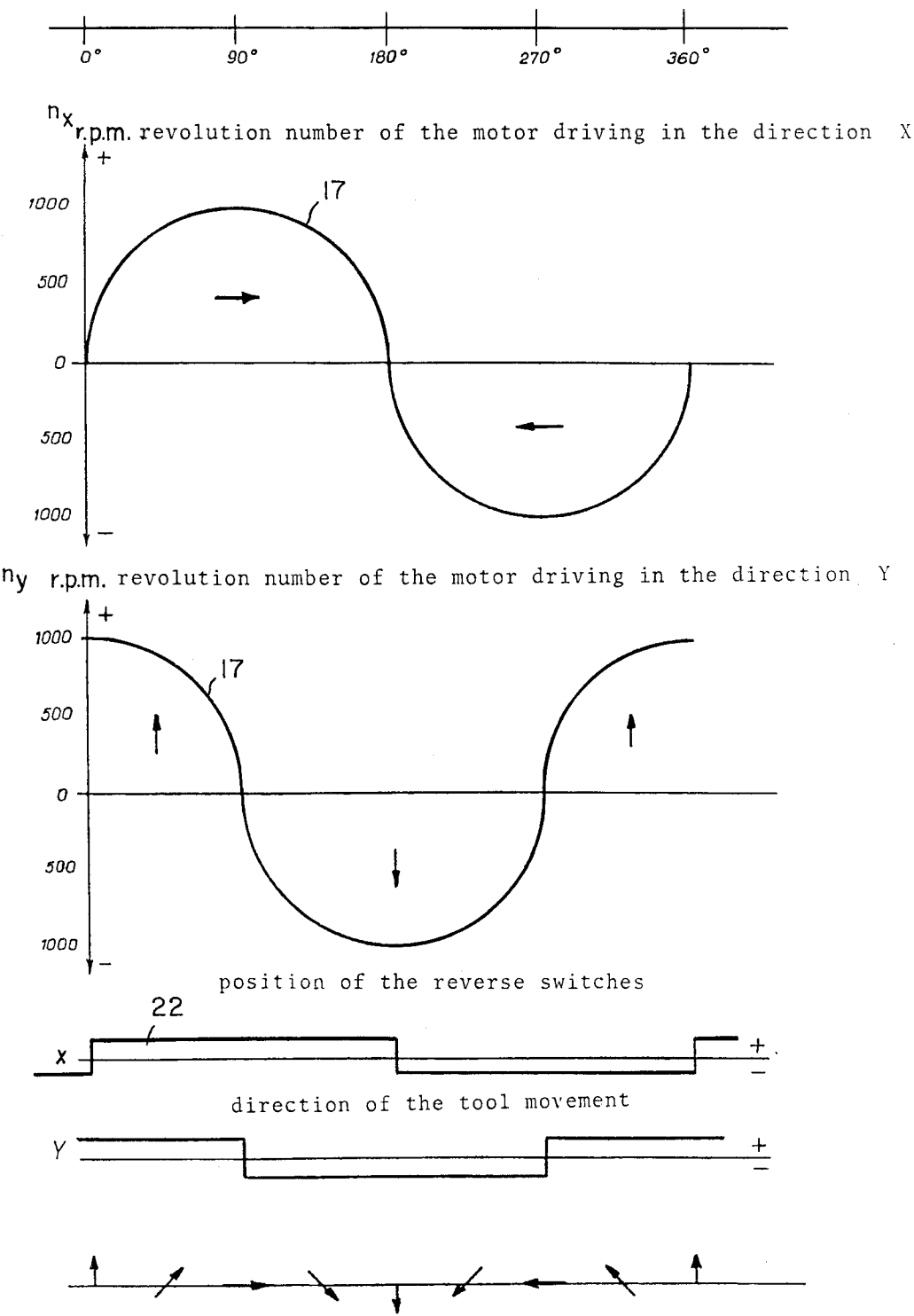
FIG. 2 is a schematic diagram of the number of revolutions of the motors, and the positions of reversing switches, and the directions of resultant displacement, in the equipment corresponding to FIG. 1.

In FIG. 2 the diagrams 17 show the required revolution numbers of the motors in the x and y directions, plotted against the angular displacement of the steering wheel 7. This function is ensured by the tappings of the potentiometers 10, 11 as shown in FIG. 1. The tappings a, b, at the potentiometer ends and the middle tapping e of the potentimeters are connected to each other and the tappings c and d are connected to each other. The joint tappings of one potentiometer are connected to the reverse joint tappings of the other potentiometer and form the terminals 19 and 20, and they are connected through the supply unit to the motors, together with the terminals coming from the sliders 18 of the potentiometers. Thus with the tapping connected as described an approximately sinusoidal voltage appears on the slider 18 of one potentiometer, and a co-sinusoidal voltage appears on the slider 18 of the other potentiometer, as a function of the angular displacement of the steering disc 7 and consequently the sliders. By displacing sliding contacts 18 by means of the transmission mechanism 9, actuated by the control disc 8, on the terminal 19 a zero voltage value and on the terminal 20 a maximal voltage value can be achieved for the number of revolutions of the motors. Thus the potentiometers 10, 11 determine the ratio of the revolution numbers of the motors 5, 6 to each other, i.e. the direction of tool movement. As noted above, potentiometer 14 controls the speed of the motors simultaneously and thereby the speed of the tool movement, quite apart from the momentary direction of the tool movement.

Changeover of the sense of rotation of the motors 5, 6, for circum-rotating the direction vector takes place by means of position switches 21, actuated by the control disc 8 according to FIG. 1. In FIG. 2 the positions of the switches 21 are shown by the diagram 22 plotted against the angular displacement of the steering wheel 7. At the bottom of FIG. 2 the resultant tool movement direction can be seen plotted against the angular displacement of the steering wheel 7.

Since machining is composed of tangential displacements, working with the equipment according to the invention does not require special attendance or practice, whereas a significantly smoother surface can be obtained in comparison to other known solutions where the surface is copied by the separated movements of the carriage saddles performed in short sections.

We claim:

1. Apparatus for copy machining having a manual control and mechanical drive, preferably for optical profile grinding machine incorporating an optical system projecting an enlarged silhouette of the workpiece and a tool as well as an enlarged layout of the profile to be reproduced on a screen, the machine being provided with two slides driven by two DC motors having controllable speeds, said apparatus comprising a steering disc, two potentiometers having their respective output terminals connected respectively to respective ones of said motors, each of said potentiometers being divided into four equal parts by five tappings and having a sliding contact connected to a respective one of said output terminals, said steering disc being connected to said sliding contacts through a control disc and transmission mechanism, the first, middle and last one of said tappings being connected with each other and the remaining two tappings being connected to one another, forming respective first and second input terminals, said first input terminal of one of said potentiometers and said second input terminal of the other of said potentiometers being connected together and said second input terminal of said one potentiometer and said first input terminal of said other potentiometer being connected together, said potentiometers providing a phase position complying with the angular displacement by 90° of the steering disc.

2. Apparatus according to claim 1, including a speed controlling potentiometer connected to said motors and a pedal coupled to said controlling potentiometer for changing its setting.

3. Apparatus according to claim 1, including means for reproducing the signalling direction of the steering disc on the screen.

* * * * *